United States Patent Office 3,422,029
Patented Jan. 14, 1969

3,422,029
CONVERSION OF 3-CARENE TO A COMPOSITION COMPRISED OF META-MENTHADIENES AND PARA-MENTHADIENES IN SUBSTANTIAL AMOUNTS
Albert B. Booth, Jekyll Island, Ga., assignor to Hercules Incorporated, Wilmington, Del., a corporation of Delaware
No Drawing. Filed Nov. 18, 1966, Ser. No. 595,350
U.S. Cl. 252—364
Int. Cl. C07c 13/00
8 Claims

ABSTRACT OF THE DISCLOSURE

A rubber solvent comprised of meta-menthadienes and para-menthadienes in admixture, is prepared by isomerization of 3-carene in the presence of an acid, such as sulfuric acid, and a surface-active agent, such as an ethylene oxide-rosin amine reaction product.

---

This invention relates to the conversion of 3-carene to products having a broader scope of utility than 3-carene alone. Particularly, this invention relates to the conversion of 3-carene to a composition of matter comprised of substantial amounts of meta-menthadienes and para-menthadienes.

3-carene is a major constituent of turpentines, and is in abundant supply. Commercially important pine species which yield turpentine rich in 3-carene are found in all continents of the world where pine trees occur naturally; some typical species being *Pinus ponderosa* in North America, *Pinus sylvestris* in Europe, and *Pinus longifolia* in Asia. The only present important commercial use of 3-carene, and related carenes, is as a solvent for paint.

An object of this invention is the conversion of 3-carene to a composition of matter having more utility than 3-carene alone.

Another object of this invention is the conversion of 3-carene to a composition of matter comprised of m-menthadienes and p-menthadienes in substantial amounts, which compositon has particular utility in rubber reclaiming processes.

Other objects of this invention will, in part, be obvious and will, in part, appear hereinafter.

For a complete understanding of the nature and the objects of this invention, reference is made to the following detailed description.

In accordance with this invention, it has been determined that 3-carene can be economically converted to a composition of matter comprised of relatively large amounts of m-menthadienes and p-menthadienes.

The 3-carene used in this invention can be separated from turpentine and from pulp mill liquors comprised thereof by known methods, such, for example, as by fractional distillation. Technical grade 3-carene will usually contain a relatively small amount of β-pinene. If β-pinene is present in the 3-carene starting material used in the process of this invention, it will be converted, during the isomerization reaction, to camphene and fenchene. If pure 3-carene is used in the method of this invention, no camphene or fenchene is formed.

The method of this invention comprised first preparing a mixture comprised of (1) 3-carene, (2) an acid catalyst in aqueous solution, and (3) a surface-active agent, to provide a mixture comprised of an oil phase (the 3-carene) and an aqueous phase (the water-acid solution, sometimes referred to hereinafter as the aqueous acid phase). The mixture is subsequently heated at elevated temperatures for a period of time sufficient to isomerize a substantial portion of the 3-carene to m-menthadienes and p-menthadienes. Usually the isomerization reaction will be carried out to the point where the reaction mass oil phase contains less than about 10% by weight of 3-carene.

Acids used in carrying out the method of this invention include the mineral acids such as sulfuric acid, nitric acid, phosphoric acid, hydrochloric acid, hydrobromic acid, hydroiodic acid, and hydrofluoric acid. The substituted sulfuric acids such as methane sulfonic acid and toluene sulfonic acid can be used also. Of the above enumerated acids, sulfuric acid and phosphoric acid are preferred. Mixtures of two or more acids can be used if desired.

The acid catalyst is employed in aqueous solution in concentrations of from about 10% to about 50% by weight of the total acid and water weight. Preferred acid concentrations are from about 20% to about 50%. In general, the optimum concentration of acid in the aqueous phase will be inversely proportional to the inherent strength of the acid. Thus, for the stronger acid, sulfuric acid, most suitable concentrations will be from about 25% to 35%, and for the weaker acid, phosphoric acid, from about 40% to 50%. Concentrations of acid above the optimum cause a rapid increase in the formation of a dimer by-product, which is undesirable. Concentrations below 10% result, in general, in reaction that is too slow to be economically feasible.

The surface-active agents employed in carrying out the method of this invention are used in amounts of from about 0.1% to about 1.0% by weight based on the weight of the 3-carene. Larger and smaller amounts can be used if desired.

Surface-active agents that can be employed include cationic surface-active agents, anionic surface-active agents, nonionic surface-active agents, and mixtures of two or more.

Examples of cationic surface-active agents include N-tallow trimethylene diamine dioleate; dehydroabietylamine - ethylene oxide adducts; lauryl dimethyl amine oxide; cetyl dimethyl amine oxide; primary fatty amine acetates; and the like. Mixtures of two or more cationic surface-active agents can be used if desired.

Examples of anionic surface-active agents include sodium alkyl sulfate; isopropylamine benzene sulfonate; sodium dodecylbenzene sulfonate; ammonium nonyl phenol polyglycol ether sulfate; sodium lauryl sulfate; ammonium lauryl sulfate; triethanol amine lauryl sulfate; and the like. Mixtures of two or more anionic surface-active agents can be used if desired.

Examples of nonionic surface-active agents include polyoxyethylene sorbitan monostearate; polyoxyethylene sorbitan monooleate; polyoxyethylene sorbitan monopalmitate; nonylpolyethylene glycol ether; polyethylene glycol monococanate; glycerol monococanate; glycerol monooleate; glycerol monostearate; nonyl phenoxy poly (ethyleneoxy) ethanol; and the like. Mixtures of two or more nonionic surface-active agents can be used if desired.

Many of the known commercially available surface-active agents and mixtures thereof (often referred to as "built" detergents) can be employed in carrying out this invention. Surface-active agents are sometimes referred to in the art as surfactants, detergents, emulsifiers, and dispersing agents. Surface-active agents employed should provide for good dispersion of the aqueous phase and the oil phase under conditions of reaction. It is also desirable that the surface-active agents employed provide for economical separation of the phases after reaction. Thus, it is desirable that the two phases (the oil phase and the water phase) separate one from the other relatively rapidly after the desired reaction has been completed. This, as is obvious to those skilled in the art, provides for subsequent economical physical separation of the two phases. The aqueous phase, which contains the acid, is subsequently recovered from the process unchanged and can be reused if desired. Surface-active agents that are preferentially water-soluble are recommended for use in the process of this invention. Such surface-active agents will usually remain in the aqueous phase which, as above set forth, can be reused if desired, and thus provide greater economy in operation. Selection of suitable surface-active agents and mixtures thereof for use in this invention is within the skill of those versed in the art, having before them this disclosure.

A highly satisfactory surface-active agent that can be used in the method of this invention is a cationic material having a molecular weight of from about 500 to 2000 derived by the condensation of ethylene oxide and a rosin amine or a stabilized rosin amine and can be represented by the formula

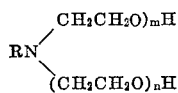

wherein R is a radical selected from the group consisting of abietyl, hydroabietyl, and dehydroabietyl and wherein $m$ and $n$ are integers such that the molecular weight is within the range of from about 500 to 2000. These condensation products can be prepared in accordance with the method described in Patent 2,510,284, reference to which is hereby made.

The initial product of condensation of the amine with ethylene oxide is an ethanol rosin amine having the formula

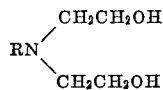

where R is the organic radical of the rosin amine. The polyethylene glycol derivatives of the rosin amines used in this invention are the products of further reaction with ethylene oxide in which the alcohol groups of the initial product react with the formation of either linkages. Thus, the product of reaction of rosin amine with seven moles of ethylene oxide is a substance of the general formula

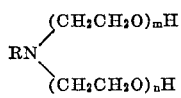

where the sum of $m$ and $n$ equals about seven. In these formulas where R is the organic radical of a rosin amine, it is intended that the radical shall include the abietyl radical, the dihydroabietyl radical, the tetrahydroabietyl radical, and the dehydroabietyl radical.

Cationic surface-active agents of the above tape are available commercially under the proprietary designation Polyrad. These surface-active agents are water-soluble or at least water dispersible. A specific cationic surface agent is the condensation product derived by reacting 11 moles of ethylene oxide with one mole of dehydroabietyl amine and is available commercially under the proprietary designation Polyrad 1100. These materials can have admixed therewith from about 10% to 100% by weight based on the ethylene oxide-rosin amine adduct of free or unreacted rosin amine. Polyrad 1110, available commercially, is comprised of about 90% by weight of the product derived by the condensation reaction of about 11 moles of ethylene oxide and one mole of dehydroabietyl amine and about 10% by weight of free or unreacted dehydroabietyl amine.

It is convenient to conduct the isomerization reaction of this invention at the atmospheric pressure boiling point of the mixture, under reflux, since boiling point temperature is self-regulating and equipment required is readily available and not complicated. If desired, the reaction can be carried out at reflux temperature at some pressure other than atmospheric. Also the reaction can be carried out below reflux temperature, maintaining the temperature substantially constant either manually or by automatic means. A pressure vessel will be required to run at temperatures above atmospheric reflux temperature. For the usual range of acid concentrations, the atmospheric reflux temperature of the 3-carene aqueous acid mixtures will be from about 100° C. to about 110° C. Operable temperatures for the process are from about 80° C. to about 140° C., with the most suitable temperature between about 90° C. and 130° C. Reduced acid concentrations are preferably used if the temperature is raised above the atmospheric reflux temperature by opearting under pressure.

The rate of conversion of 3-carene to a mixture comprised of m-menthadienes and p-menthadienes is increased by increasing the amount of aqueous phase in the reaction mixture. Increasing the aqueous phase decreases the amount of oil phase which can be processed per batch however. A suitable ratio of the oil phase to the aqueous phase is about 1:1 and this is preferred, although other ratios can be used. Thus, for example, a ratio of the oil phase to the aqueous phase of 2:1 to 1:2 can be employed with satisfactory results.

During the isomerization reaction it is important that the oil phase be substantially uniformly dispersed throughout the aqueous phase at all times. This can be accomplished by any suitable means such, for example, as by means of a motor driven stirrer.

Although the batch mode of operation is used in the working examples, the rapid rate of reaction that can be obtained in this process, i.e., substantially complete reaction in 3 hours or less, makes the process readily adaptable to a continuous operation. In its simplest form, the continuous method can be accomplished by use of a blackmix reactor wherein 3-carene is continuously fed to the reactor and an oil phase comprised of the desired isomerization product is withdrawn continuously.

The time required for substantial conversion of 3-carene to a mixture comprised of meta- and para-menthadienes will vary inversely with temperature. Conversion time, with other variables fixed, will also vary inversely with the acid strength, and it will vary inversely also with the ratio of the aqueous phase to the oil phase.

If desired, the composition derived by the 3-carene isomerization can be fractionally distilled into separate fractions. Alpha-terpinene; 2,4(8) p-menthadiene; and 1,3(8) m-menthadiene can be separated and each heated with 5% Pd on carbon, or other suitable catalyst, for conversion to the respective cymenes. The residue mixture of menthadienes can be used as a solvent in rubber reclaiming processes.

Examples 1 and 2 below are illustrative of this invention. In all examples that follow, parts and percentages are by weight, unless otherwise specified.

EXAMPLE 1

Eight hundred and fifty (850) parts of 94.6% 3-carene (impurities are other turpentine components), 1180 parts of a 25% aqueous solution of sulfuric acid, and 3 parts of Polyrad 1110 cationic surface-active agent are charged to a reaction vessel equipped with a motor driven stirrer, a reflux condenser, and a thermometer. The resulting mixture is heated to reflux (about 103° C.) with stirring and maintained at reflux, with stirring, for 9 hours to provide a reaction mass. The reaction mass is easily separated into an oil phase layer and an aqueous phase layer. The oil phase has the following composition:

| | Percent |
|---|---|
| 3-carene | 11.3 |
| α-Terpinene (a para-menthadiene) | 23.2 |
| γ-Terpinene (a para-menthadiene) | 16.2 |
| 3(8) p-menthadiene | 1.1 |
| 2,4(8) p-menthadiene | 12.7 |
| 1,3(8) m-menthadiene | 22.0 |
| Meta- and para-cymene | 2.1 |
| Others | 11.4 |

Thus, starting with 94.6% pure carene there is provided a composition containing about 75.2% of m- and p-menthadienes. Six hundred and fifty (650) parts of the recovered oil phase layer is charged with 650 parts of water to a distillation flask, and the monomeric components thereof recovered by steam distillation. The residue polymeric portion is about 1.4% of the initial 650 parts oil phase layer. The distillate or monomer portion has the following physical analysis:

| | |
|---|---|
| ASTM boiling point range (5%–95%) ° C | 180.4–190.1 |
| Sp. Gr. at 15.6° C. | 0.8598 |
| R. I. at 20° C. | 1.4887 |
| Aniline point ° C | Below 0 |
| Flash point (Cleveland) ° C | 61 |

EXAMPLE 2

Eight hundred and fifty (850) parts of 94.6% 3-carene (impurities were other turpentine components), 1260 parts of 35% sulfuric acid, and 3 parts of Polyrad 1110 cationic surface-active agent are charged to a reaction vessel similar to that used in Example 1. The resulting mixture is heated to reflux (about 108° C.), with stirring, and is maintained under these conditions for three hours. After three hours the oil phase of the reaction mass has the following composition:

| | Percent |
|---|---|
| 3-carene | 1.8 |
| α-Terpinene (a para-menthadiene) | 29.3 |
| γ-Terpinene (a para-menthadiene) | 13.0 |
| 3(8) p-menthadiene | 4.3 |
| 2,4(8) p-menthadiene | 20.0 |
| 1,3(8) m-menthadiene | 20.7 |
| Others | 10.9 |

Thus, a 94.6% pure 3-carene starting material is converted by the process of this example in three hours to a composition comprised of about 87.3% of m- and p-menthadienes.

Example 3 below is illustrative of the results obtained when no surface-active agent is employed in the process.

EXAMPLE 3

One hundred and twenty-eight (128) parts of 95% 3-carene (impurities were other turpentine components) is agitated under reflux and under $CO_2$ with 504 parts of 50% sulfuric acid for about one hour at 108–115° C. An oil phase layer is separated, water-washed and dried. Vacuum distillation indicates the presence of 11.5% of terpene dimer (the residue portion). Infrared and ultraviolet analyses indicate the distillate to be about 85% 3-carene, no cymene, some unidentified material, and about 7% α-terpinene (a para-menthadiene). Another run as above, except for a period of 5 hours under reflux, gave a product containing 52% terpene dimer. It will thus be apparent that the use of a surface-active agent is a critical and important aspect of this invention.

Examples 4 and 5 below illustrate the use of various other surface active agents in carrying out this invention.

EXAMPLE 4

Into a one liter flask equipped with a standard half-moon type agitator blade are placed 297 parts of 95% 3-carene, 441 parts of 35% sulfuric acid, and 1 part of polyoxyethylene sorbitan monooleate (a nonionic surface-active agent available commercially under the proprietary designation Tween 60). The resulting mixture is agitated by means of the agitator rotating at a speed of 700 r.p.m., at reflux temperature (about 105° C.), until isomerization of the 3-carene is substantially complete and there is provided an oil phase reaction mass containing a substantial amount of m- and p-menthadienes. This required a period of about 10 hours. After reaction the reaction mass separated easily and readily into an oil phase layer and an aqueous phase layer.

EXAMPLE 5

Example 4 is repeated using N-tallow trimethylene diamine dioleate as the surface-active agent. This is a cationic type available commercially under the proprietary designation Duomeen TDO. Substantially the same conversion is obtained in about three hours rather than the ten hours of Example 4.

EXAMPLE 6

Three hundred and sixty-seven (367) parts of 10% hydrochloric acid, 297 parts of 95% 3-carene, and one part of Polyrad 1110 are stirred together at reflux temperature (about 101° C.), using the apparatus of Example 4. Samples are withdrawn from the reaction vessel periodically and analyzed to follow the course of the isomerization. Infrared analysis shows that the 3-carene is substantially completely reacted or converted in ten hours, and the product is a mixture comprised chiefly of meta- and para-menthadienes. Duplication of this example, except that 18% hydrochloric acid is used in place of 10% acid, decreases the reaction time to two hours.

EXAMPLE 7

Four hundred and thirty-seven (437) parts of 40% phosphoric acid and 297 parts of 95% 3-carene are stirred together in a one liter stainless steel autoclave at 125° C. with one part of Polyrad 1110. The system develops a pressure of 25 p.s.i.g. The reaction is complete in ten hours. The product analysis is very similar to that of Example 2.

EXAMPLE 8

Four hundred and sixty-six (466) parts of 50% phosphoric acid and 297 parts of 95% 3-carene and one part Polyrad 1110 are stirred together at reflux temperature using the apparatus of Example 4. Samples are withdrawn periodically and analyzed to follow the course of the reaction. The reaction is substantially complete in ten hours. The product is very similar in composition to that of Example 2, as determined from its infrared spectrogram.

The following example illustrates the utility of the composition of matter prepared in accordance with this invention.

EXAMPLE 9

One part of scrap rubber is heated to 150° C. with three parts of the solvent composition obtained in Example 1. The rubber is dissolved in the solvent and the resulting solution is filtered through a 60-mesh screen, whereby fabric and pigment are removed. The solvent is separated from the rubber by distillation under vacuum. Free sulfur in the scrap rubber is combined with the solvent composition and is subsequently separated from the rubber by removing it in combined form with the solvent on distillation. The solvent composition is recovered in a pure form by further distillation; the residue of the distillation containing sulfur compounds. The reclaimed rubber, after separation from the solvent, is given further treatment as necessary for its reuse.

The method of this invention provides for isomerization of 3-carene to m- and p-menthadienes in substantial yields. The composition resulting from the isomerization reaction can be used as a solvent in the reclamation of rubber, the composition being rich in m- and p-menthadienes which are rubber solvents.

It is to be understood that the above description and working examples are illustrative of this invention and not in limitation thereof.

What I claim and desired to protect by Letters Patent is:

1. A method of preparing a solvent composition comprised of para-menthadienes and meta-menthadienes which comprises heating at temperatures of from about 80° C. to about 140° C., a mixture consisting essentially of (1) an oil phase comprised of 3-carene (2) an aqueous phase comprised of an aqueous solution of an acid, said acid selected from the group consisting of sulfuric acid, nitric acid, phosphoric acid, hydrochloric acid, hydrobromic acid, hydroiodic acid, hydrofluoric acid, methane sulfonic acid, toluene sulfonic acid and mixtures thereof, of an acid concentration of from about 10% to about 50% by weight of the solution weight, and (3) a surface-active agent selected from the group consisting of cationic, anionic and nonionic surface-active agents and mixtures thereof, said heating being carried out for a period of time sufficient to provide an oil phase reaction mass containing less than about 10% by weight 3-carene.

2. The method of claim 1, wherein the acid of which the aqueous phase (2) is comprised is sulfuric acid and the concentration thereof is from about 25% to 35% by weight of the solution weight.

3. The method of claim 1 wherein the acid of which the aqueous phase (2) is comprised is phosphoric acid and the concentration thereof is from about 40% to 50% by weight of the solution weight.

4. The method of claim 1 wherein the surface-active agent is a cationic surface-active agent.

5. The method of claim 2 wherein the surface-active agent is comprised of a material of the formula

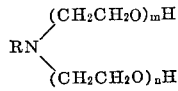

having a molecular weight between about 500 and about 2000, wherein R is selected from the group consisting of abietyl, hydroabietyl, and dehydroabietyl and wherein $m$ and $n$ are integers such that the molecular weight is within the above range.

6. The method of claim 3 wherein the surface-active agent is comprised of a material of the formula

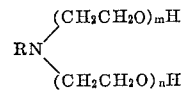

having a molecular weight between about 500 and about 2000, wherein R is selected from the group consisting of abietyl, hydroabietyl, and dehydroabietyl and wherein $m$ and $n$ are integers such that the molecular weight is within the above range.

7. The method of claim 2 wherein the surface-active agent is polyoxyethylene sorbitan monooleate.

8. The method of claim 2 wherein the surface-active agent is N-tallow trimethylene diamine dioleate.

References Cited

UNITED STATES PATENTS 2,097,744  11/1937  Sheffield ......... 260—675.5
3,026,315   3/1962  Weitkamp ......... 252—364
3,108,079  10/1963  Wixon ............ 252—99

OTHER REFERENCES

O. T. Zimmerman and Irvin Lavene: Handbook of Material Trade Names, Supplement (I and II), 1953.

James Verghese: Journal Indian Chem. Soc., vol. 36, No. 3, 1959.

LEON D. ROSDOL, *Primary Examiner.*

B. BETTIS, *Assistant Examiner.*

U.S. Cl. X.R.

260—675.5